United States Patent [19]

Takenaka et al.

[11] Patent Number: 5,220,445
[45] Date of Patent: Jun. 15, 1993

[54] OPTICAL IMAGE PROCESSOR

[75] Inventors: Hiromitsu Takenaka; Nozomu Ohkouchi; Masanobu Shigeta, all of Yokosuka; Shigeo Shimizu, Yokohama; Toshio Konno, Hoya, all of Japan

[73] Assignee: Victor Company of Japan, Ltd., Yokohama, Japan

[21] Appl. No.: 943,374

[22] Filed: Sep. 10, 1992

Related U.S. Application Data

[63] Continuation of Ser. No. 645,592, Jan. 24, 1991, abandoned.

[30] Foreign Application Priority Data

Jan. 26, 1990 [JP] Japan .................. 2-17453
Jun. 29, 1990 [JP] Japan .................. 2-173595

[51] Int. Cl.⁵ .................................. G02F 1/13
[52] U.S. Cl. ............................ 359/72; 359/71; 257/131
[58] Field of Search .......... 350/342, 338, 334; 357/30 L, 30 K; 359/71, 72; 257/431

[56] References Cited

U.S. PATENT DOCUMENTS

| | | | |
|---|---|---|---|
| H840 | 11/1990 | Efron et al. | 350/342 |
| 4,110,014 | 8/1978 | Yevick | 350/342 |
| 4,150,876 | 4/1979 | Yevick | 350/338 |
| 4,191,452 | 3/1980 | Grinberg et al. | 350/342 |
| 4,239,348 | 12/1980 | Grinberg et al. | 350/342 |
| 4,807,976 | 2/1989 | Little et al. | 350/342 |
| 4,828,366 | 5/1989 | Nelson | 350/342 |
| 4,913,531 | 4/1990 | Efron et al. | 350/342 |
| 4,941,735 | 7/1990 | Moddel et al. | 350/338 |
| 4,973,136 | 11/1990 | Braatz | 350/338 |
| 5,076,670 | 12/1991 | Sayyah | 359/72 |

FOREIGN PATENT DOCUMENTS 54-17867 2/1979 Japan .................. 350/342

OTHER PUBLICATIONS

Applied Optics, "Transfer Characteristics of the Microchannel Spatial Light Modulator," Nov. 15, 1989, vol. 28, No. 22, pp. 4781-4786.
Applied Optics, "Experimental Parameters of the Photoemitter Membrane Spatial Light Modulator", Nov. 15, 1989, vol. 28, No. 22, pp. 4816-4825.
Applied Optics, "Liquid Crystal Spatial Light Modulator with a Transmissive Amorphous Silicon Photoconductor", May 1, 1988, vol. 27, No. 9, pp. 1797-1802.
J. Appl. Phys., "The Silicon Liquid-Crystal Light Valve", Feb. 15, 1985, pp. 1356-1368.

Primary Examiner—Rolf Hille
Assistant Examiner—Minhloan Tran
Attorney, Agent, or Firm—Michael N. Meller

[57] ABSTRACT

There is provided an optical image processor for forming a charge image according to a first optical image by photoelectric effect when illuminated with an electromagnetic radiation beam for writing carrying the first optical image and forming, in accordance with the charge image, a second optical image correlating with the first optical image by light-modulation when illuminated with an electro-magnetic radiation beam for reading, in the presence of an electric field. The processor comprises a plurality of photoconductive segments two-dimensionally arranged with a space among the photoconductive segments for forming the charge image when illuminated with the electro-magnetic radiation beam for writing and a high resistive member provided in the space for preventing transfer of electric charges of the formed charge image among the photoconductive segments.

6 Claims, 5 Drawing Sheets

OPTICAL IMAGE PROCESSOR

This application is a continuation, of application Ser. No. 645,592, filed Jan 24, 1991, now abandoned.

BACKGROUND OF THE INVENTION

The present invention relates to an optical image processor, and more particularly, to an improvement of an optical image processor applicable to analog parallel processing and display of a moving or still picture, etc.

FIGS. 1 and 2 show conventional optical image processors 1a and 1b respectively, which were made known in the lecture of applied physics society in fall, 1989.

The optical image processor 1a shown in FIG. 1 will be explained first. In the figure, a photoconductive member 14 of bismuth silicon oxide (BSO) and dielectric mirror 12 are laminated to a liquid crystal complex member 10 of polymer and nematic liquid crystal. Those are sandwiched between transparent electrodes 16 and 18 of indium tin oxide (ITO). Further, a glass substrate 20 is laminated to the transparent electrode 18. A power supply 21 for driving the optical image processor 1a is connected across the transparent electrodes 16 and 18.

In the case of image writing, a beam of light (a writing light) such as an Ar laser beam is radiated to the photoconductive member 14 via the transparent electrode 16 as depicted by an arrow F1. An optical image carried by the laser beam is stored in the photoconductive member 14 as a charge image.

On the other hand, in the case of image reading, a beam of light (a reading light) such as He-Ne laser beam is radiated to the liquid crystal complex member 10 via the glass substrate 20 and transparent electrode 18. The liquid crystal complex member 10 is applied with an electric field due to the charge image in the photoconductive member 14. The reading light is thus modulated according to the charge image. The modulated reading light is then reflected at the dielectric mirror 12 and emitted out from the optical image processor 1a as depicted by an arrow F3.

Next, the optical image processor 1b shown in FIG. 2 will be explained. In FIG. 2, a liquid crystal cell 22 is laminated with a photoconductive member 24 of hydrogenated amorphous silicon (a-Si:H) of i-type. Those are sandwiched between transparent electrodes 26 and 28 of ITO. Further, glass substrates 30 and 32 are laminated to the transparent electrodes 26 and 28, respectively. A power supply 34 for driving the optical image processor 1b is connected across the transparent electrodes 26 and 28. Writing and reading operation of the optical image processor 1b is the same as those explained with reference to FIG. 1.

However, in the above-mentioned optical image processors 1a and 1b, material of the photoconductive member for forming the charge image and dielectric mirror have relatively low resistivity, that is, $\rho < 10_{10} \Omega.cm$. Therefore, electric charges of the charge image are transferred to the portion of the photoconductive member to which a writing light of weak optical intensity is radiated from the portion thereof to which a writing light of strong optical intensity is radiated. This results in a reduction in the contrast and resolution of a reproduced optical image.

Particularly, the photoconductive member 14 in FIG. 1 is composed of BSO so that a blue writing light only can be used for the image writing. On the other hand, the photoconductive member 24 in FIG. 2 is composed of a - Si: H so that the writing light is not limited to the blue writing light. However, a-Si:H is less sensitive to light in the region under 600 nm of wavelength and optical transmittance of a-Si:H exhibits almost 0% in that region as shown in FIG. 3. Therefore, a charge image is formed only in the vicinity of the surface of the photoconductive member 24. Accordingly, writing of an optical image to the optical image processor 1b in that region is very difficult.

SUMMARY OF THE INVENTION

An object of the present invention is to provide an improved optical image processor by which contrast and resolution, etc., of a reproduced optical image are improved.

Another object of the present invention is to provide an improved optical image processor by which writing of an optical image in a short wavelength region is possible.

According to the present invention, there is provided an optical image processor for forming a charge image according to a first optical image by photoelectric effect when illuminated with an electro-magnetic radiation beam for writing the first optical image and forming, in accordance with the charge image, a second optical image correlating with the first optical image by light-modulation when illuminated with an electro-magnetic radiation beam for reading, in the presence of an electric field, which comprises a plurality of photoconductive segments two-dimensionally arranged with a space among the photoconductive segments for forming the charge image when illuminated with the electro-magnetic radiation beam for writing and a light resistive member provided in the space for preventing transfer of electric charges of the formed charge image among the photoconductive segments.

Accordingly, the present invention is advantageous in that the transfer of the electric charges of the charge image formed in the photoconductive segments is prevented by the light resistive member so that contrast and resolution, etc., of a reproduced optical image are improved.

In addition, the space among the photoconductive segments is provided with the transparent light resistive member so that a radiation area of the electro-magnetic radiation beam for writing to the photoconductive segments is substantially increased.

The other objects and features of the present invention will become understood from the following description with reference to the accompanying drawings.

DETAILED DESCRIPTION OF THE PREFERRED EMBODIMENTS

Figure 1:
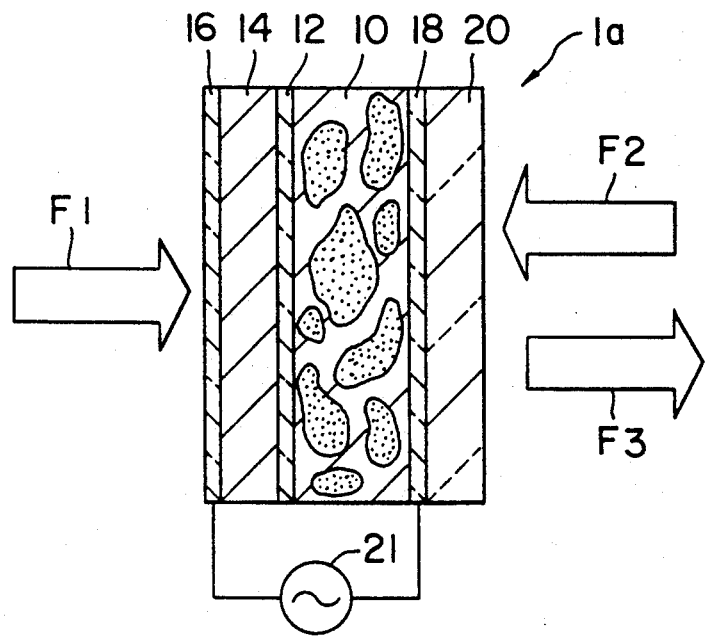
FIGS. 1 and configuration of conventional optical image , respectively.
Figure 2:
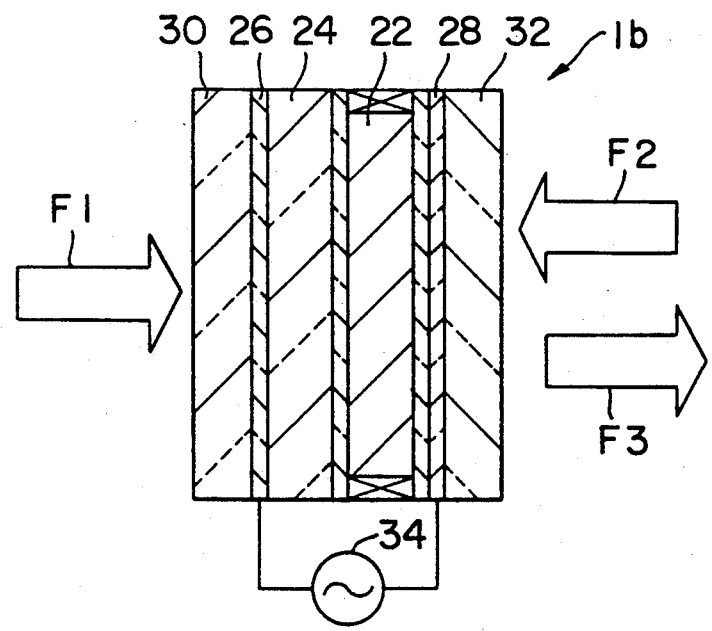
Figure 3:
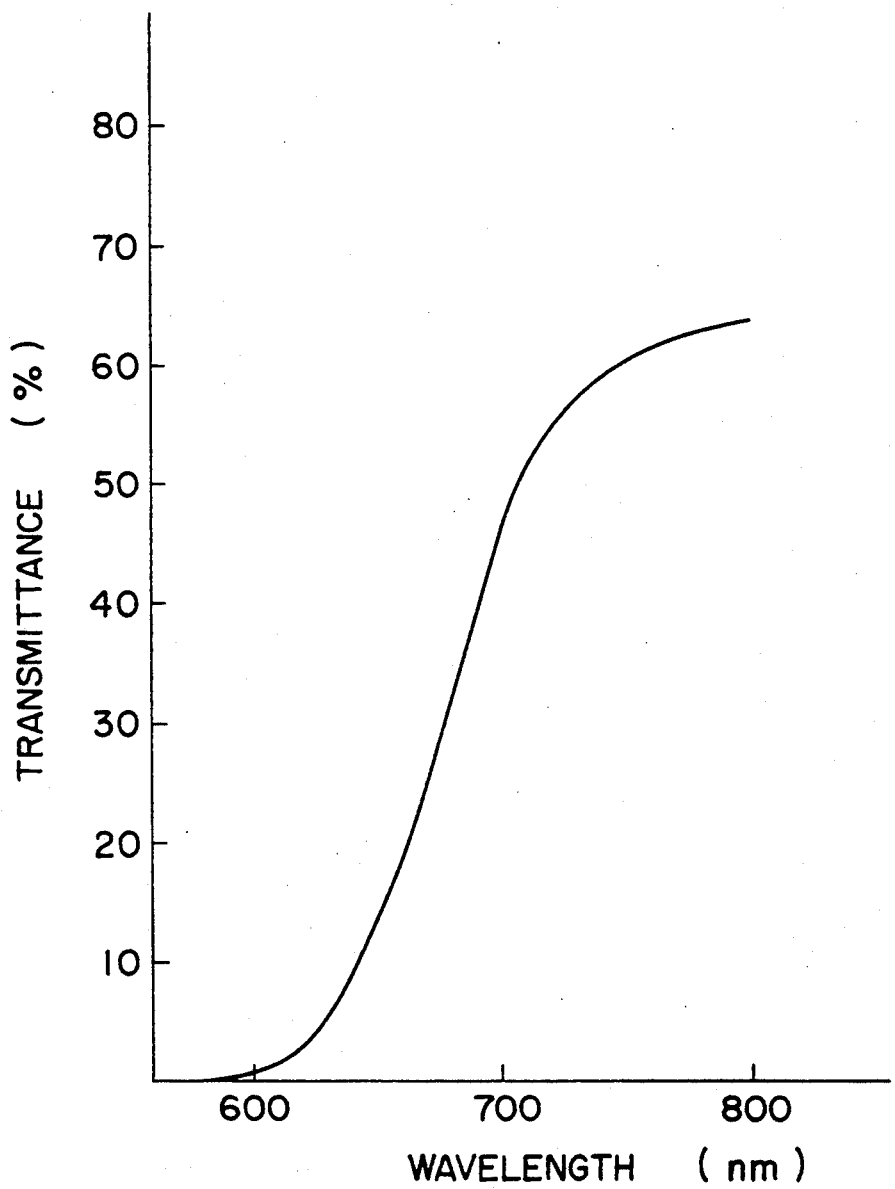
FIG. 3 is a graph showing an example of optical transmittance of a-Si:H.

The present invention is now described in detail with reference to the accompanying drawings. Throughout the drawings, like reference numerals and letters are used to designate like or equivalent elements for the sake of simplicity of explanation.

Figure 4A:
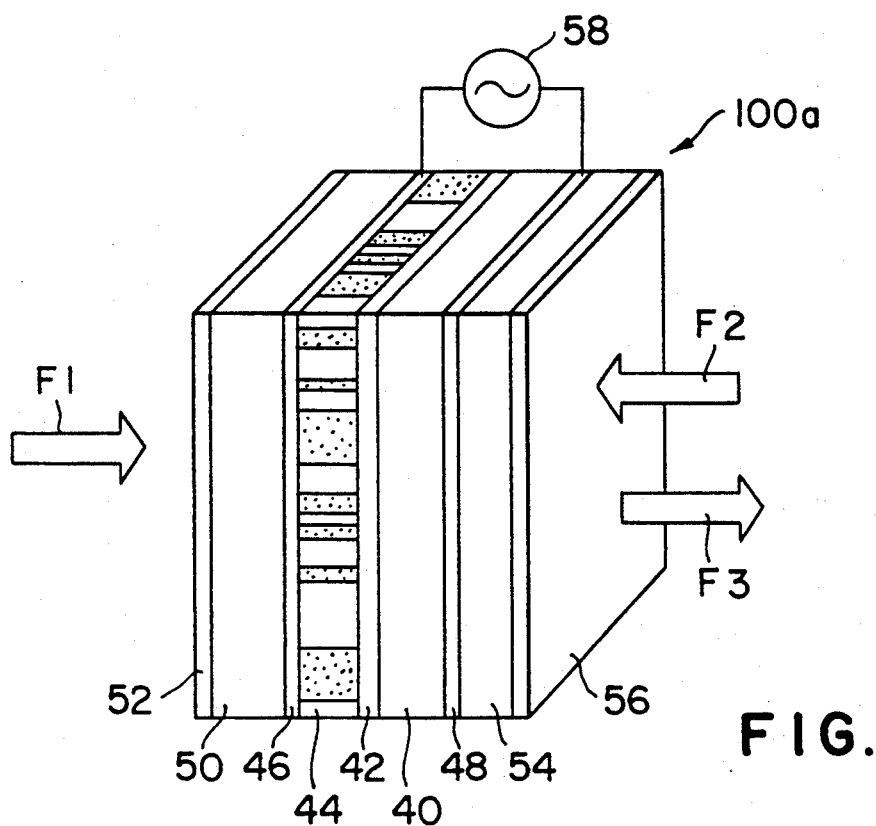
FIG. 4A shows overall configuration of a first preferred embodiment of an optical image processor according to the present invention.

A first preferred embodiment of the present invention will be explained with reference to FIGS. 4A and 4B. As shown in FIG. 4A, an optical image processor 100a is composed as described below.

An photoconductive member 44 and a dielectric mirror are laminated in order, to a light-modulation member 40 of liquid crystal at the side thereof to which a writing light is radiated. Those light-modulation member 40, dielectric mirror 42 and photoconductive member 44 are sandwiched between transparent electrodes 46 and 48.

A glass substrate 50 and anti-reflection film 52 are laminated in order, to the transparent electrode 46 at the side thereof to which the writing light is radiated. On the other hand, a glass substrate 54 and anti-reflection film 56 are laminated in order, to the transparent electrode 48 at the side thereof to which a reading light is radiated. Further, a power supply 58 for driving the optical image processor 100a is connected across the transparent electrodes 46 and 48.

Figure 4B:
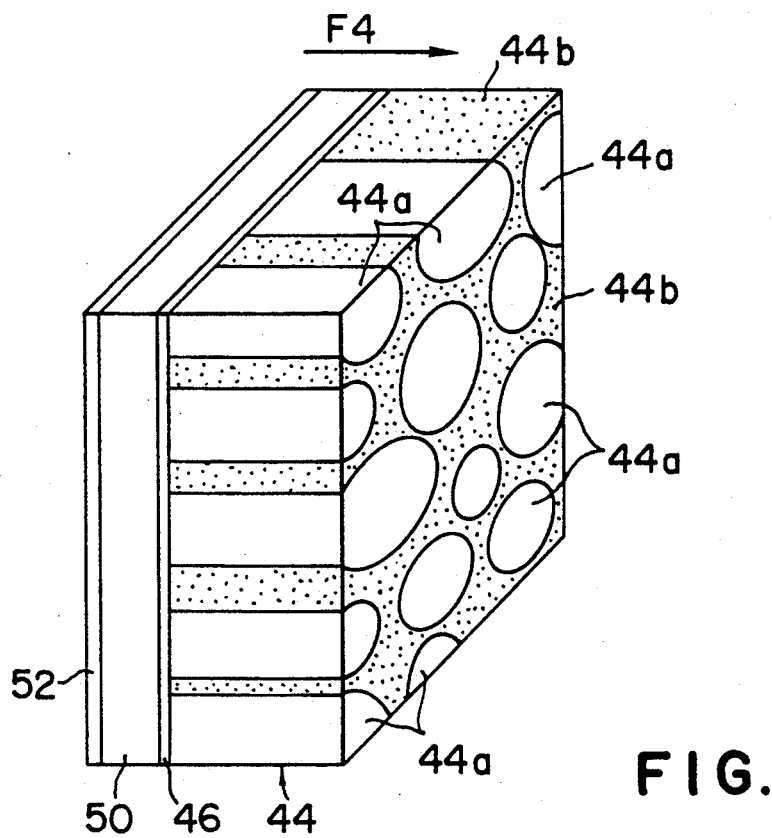
FIG. 4B is an enlarged view of main components of the optical image processor shown in FIG. 4A.

The photoconductive member 44 is composed, as shown in FIG. 4B, of many photoconductive segments 44a of pillar-like structure in a direction of an electric field produced due to a voltage applied by the power supply 58, depicted by an arrow F4 and a high resistive member 44b of high resistivity filled among the photoconductive segments 44a.

This photoconductive member 44 can be manufactured in different methods as described below.

(1). A photoconductive material of specified thickness as material of the photoconductive segments 44a is firstly laminated on the transparent electrode 46 formed on the glass substrate 50. The photoconductive material is etched with a mask of specified pattern. This results in many photoconductive segments 44a being formed on the transparent electrode 46. High resistive polymer material is applied or high resistive inorganic material is deposited among the photoconductive segments 44a to embed the high resistive member 44b therebetween. The surfaces of the photoconductive segments 44a and high resistive member 44b are polished.

(2). A mask of specified pattern is used when the photoconductive member 44 is laminated to the transparent electrode 46. The many photoconductive segments 44a are., first formed on the transparent electrode 46. The following processes are the same as described in (1).

(3) The high resistive member 44b is formed first. For example, high resistive material of specified thickness is laminated on the transparent electrode 46. The high resistive material is etched with a mask. Photoconductive material is then embedded in cavity portions formed on the high resistive material by the etching. After that, the surfaces of the photoconductive material and high resistive member are polished.

(4). A mask of specified pattern in used when high resistive material is laminated on the transparent electrode 46. A pillar-like high resistive member 44b is formed on the transparent electrode 46. Following processes are the same as described in (3). And (5). An aluminium layer is formed on the transparent electrode 46 by such as deposition. The aluminium layer is oxidated to form alumina of resistivity $\rho = 10^{14}$ $\Omega$.cm having pillar-like cavity portions. Photoconductive material is embedded in the cavity portions thus produced. After that, the surfaces of the photoconductive material and alumina are polished.

To the photoconductive member 44 formed as described above, the dielectric mirror 42, light-modulation member 40, transparent electrode 48, glass substrate 54 and anti-reflection film 56 are laminated in order.

Employed as the light-modulation member 40 is such as a film of polymer-nematic liquid crystal complex by which optical intensity of a reading light varies according to distribution of an electric field applied thereto.

Further, employed as the dielectric mirror 42 is a film of $TiO_2$ and $SiO_2$ laminated to each other and a film of Si and $SiO_2$ laminated to each other, etc.

As mentioned above, the optical image processor 100a shown in FIG. 4A is formed.

Then, operation of the first preferred embodiment of the present invention will be explained. In FIG. 4A, when a writing light from an object (not shown) is incident to the optical image processor 100a as depicted by an arrow F1, the writing light passes through the anti-reflection film 52, glass substrate 50 and transparent electrode 46 and then reaches the photoconductive member 44.

Electron-hole pairs are produced in the photoconductive member 44 according to optical intensity of the light incident thereto to change resistivity thereof. This results in a charge image formed therein according to the optical intensity of the light incident thereto.

As already mentioned, in the prior art, the electric charges of the charge image are transferred to the portion of the photoconductive member to which a writing light of weak optical intensity is incident from the portion thereof to which a writing light of strong optical intensity is incident.

On the contrary, in the first preferred embodiment, such transfer of the electric charges is prevented because the high resistive member 44b is provided among the photoconductive segments 44a. This means that the transfer of the electric charges is restricted in the same photoconductive segment 44a.

Components of the writing light reaching the high resistive member 44b are reflected there or absorbed therein and converted into heat so that transmittance is deteriorated. However, the overall characteristics of the image processor 100a, that is, resolution and contrast, etc., are improved due to prevention of the transfer of the electric charges as described above.

The light-modulation member 40 is applied with an electric field produced due to the charge image formed as described above via the dielectric mirror 42. Distribution of the electric field corresponds to distribution of the charge image, that is, an optical image carried by the writing light.

When a reading light is radiated to the optical image processor 100a as depicted by an arrow F2, the reading light passes through the anti-reflection film 56, glass substrate 54, and transparent electrode 48 in order and then reaches the light-modulation member 40.

The optical state of the reading light varies according to the electric field applied thereto in the light-modulation member 40. For example, optical axes of molecules of nematic liquid crystal are reoriented as being orthogonal to the face of the transparent electrode 48. The reading light is thus modulated. The modulated reading light is further incident to the dielectric mirror 42 and is reflected there and is then emitted out from the optical image processor 100a at the anti-reflection film 56 side thereof, as depicted by an arrow F3. As described above, the original optical image of the object is reproduced.

Figure 5A:
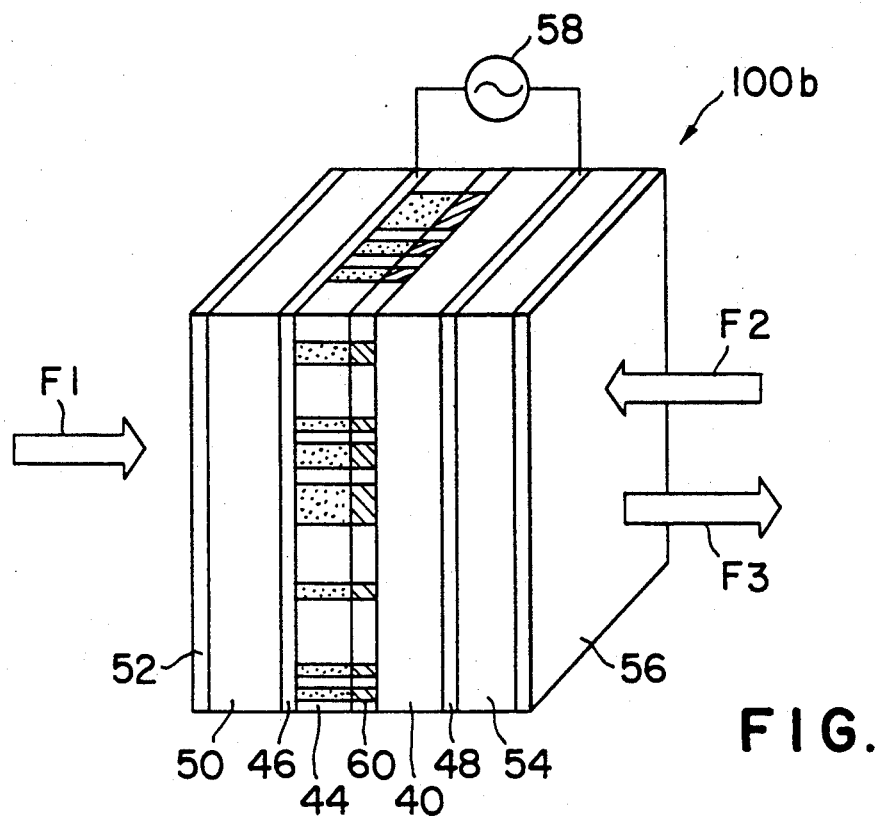
FIG. 5A shows overall configuration of a second preferred embodiment of an optical image processor according to the present invention.
Figure 5B:
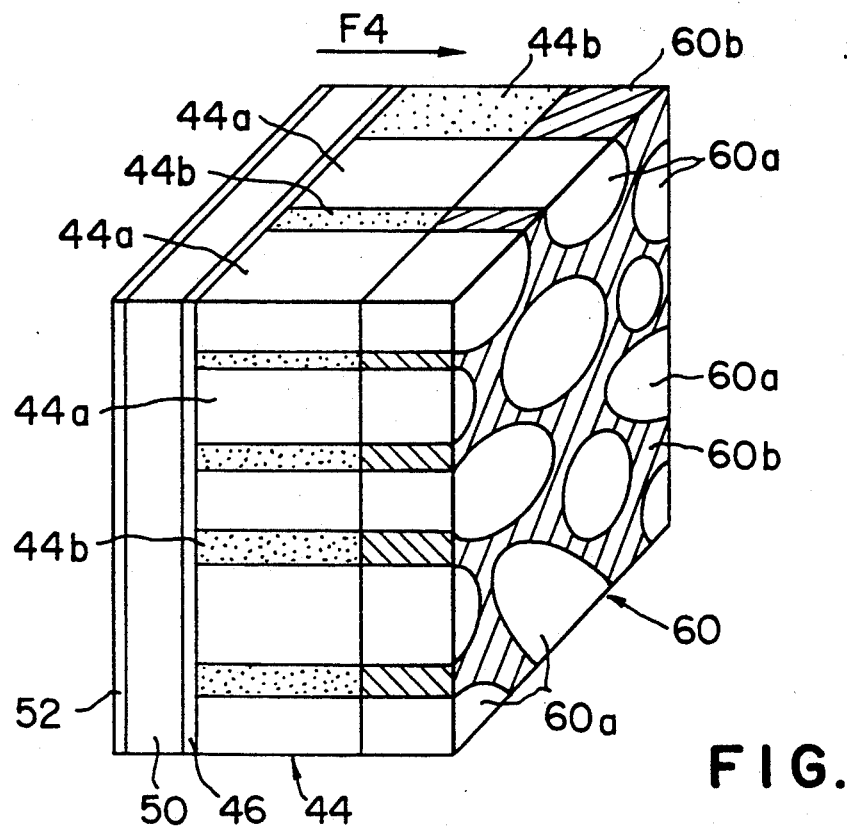
FIG. 5B enlarged view of main components of the optical image processor shown in FIG. 5A.

A second preferred embodiment according to the present invention will be explained with reference to FIGS. 5A and 5B. The photoconductive member 44 is only segmented in the first preferred embodiment, whereas a dielectric mirror 60 is also segmented in the second preferred embodiment.

An optical image processor 100b comprises the dielectric mirror 60 disposed between the light-modulation member 40 and the photoconductive member 44. The dielectric mirror 60 has pillar-like construction the same as the photoconductive member 44 described above. Namely, as shown in FIG. 5B, the dielectric mirror 60 is composed of many dielectric segments 60a of pillar-like construction in the direction of an electric field produced due to a voltage applied by the power supply 58 depicted by the arrow F4 and high resistive member 60b filled among those segments 60a. The dielectric mirror 60 is manufactured in the same manner as the photoconductive member 44.

According to the second preferred embodiment, since the dielectric mirror 60 is also segmented, transfer of the electric charges forming the charge image in the photoconductive member 44 is further restricted. Therefore, reduction in resolution and contrast of a reproduced optical image is further prevented.

Figure 6A:
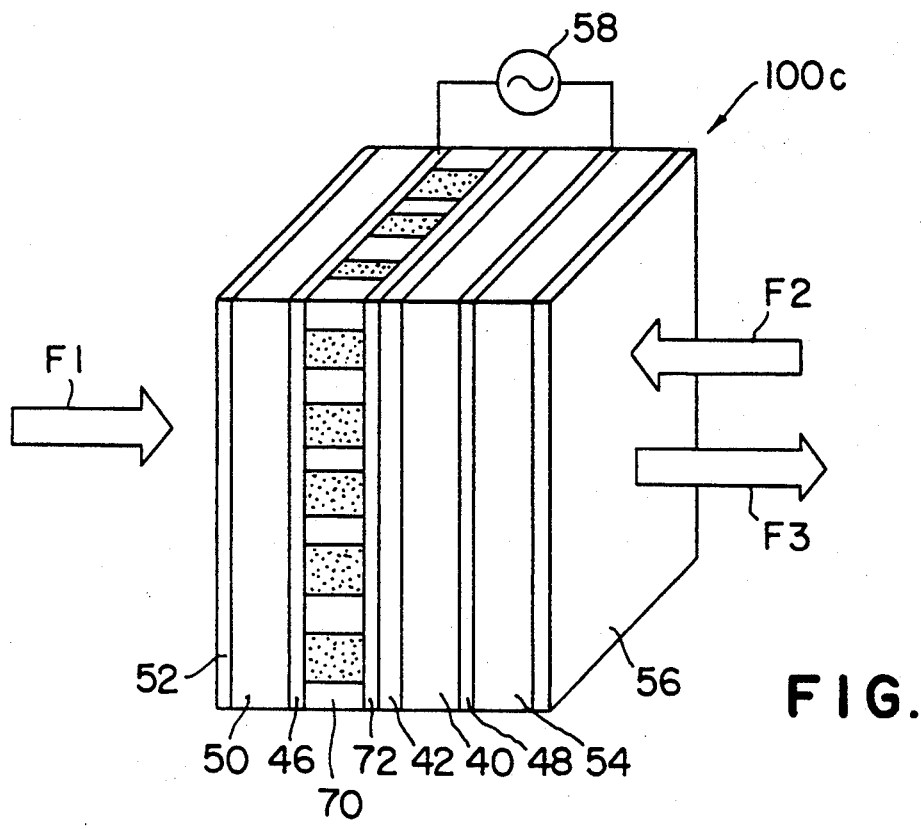
FIG. 6A shows overall configuration of a third preferred embodiment of an optical image processor according to the present invention.

A third preferred embodiment according to the present invention will be explained with reference to FIGS. 6A and 6B. In this embodiment, a photoconductive member 70 is only segmented. An optical image processor 100c comprises a light blocking member 72 of a deposited film of such as Si, Ge and B, which is disposed between the photoconductive member 70 and dielectric mirror 42.

Figure 6B:
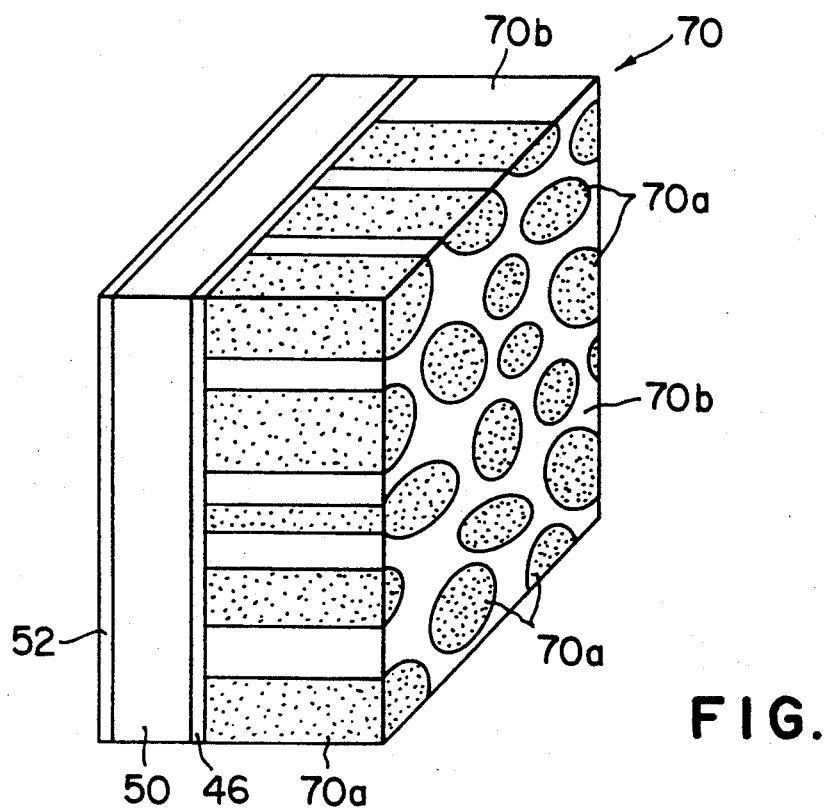
FIG. 6B is an enlarged view of main components of the optical image processor shown in FIG. 6A.

As shown in FIG. 6B, the photoconductive member 70 is composed of many photoconductive segments 70a of a-Si:H having pillar-like structure in the direction of an electric field applied thereto and a transparent high resistive member 70b of transparent high resistive alumina ($Al_2O_3$) filled between the conductive segments 70a.

This alumina is formed such as by anodic oxidation of aluminium film and pillar-like cavity portions are formed at the same time. The a-Si:H is formed in each of the cavity portions to form the photoconductive member 70.

This a-Si:H is formed by plasm chemical vapor deposition. Specifically, $SiH_4$ gas of 15cc and $H_2$ gas of 60cc are made to flow together over the cavity portions to form a-Si:H. At this time, a boron doping process of boron of 5 to 10 ppm is also performed if necessary.

Operation of the third preferred embodiment will be explained with reference to FIG. 6A. When a writing light is radiated to an optical image processor 100c as depicted by the arrow F1, the writing light reaches the photo conductive member 70.

As shown in FIG. 6B, a-Si:H of the photoconductive segments 70a of the photoconductive member 70 exhibits relatively high transmittance to a red light of wavelength 600 nm or more. Therefore, electrical resistance of the photoconductive segments 70a varies according to an optical image carried by the writing light.

On the other hand, to light of wavelength 600 nm or less, a-Si:H exhibits extremely low transmittance. Therefore, electrical resistance of the photoconductive segments 70a varies only in the vicinity of the surface thereof to the light of wavelength 600 nm or less.

However, since formed among the photoconductive segments 70a of the photoconductive member 70 is the transparent high resistive member 70b so that components of the writing light are scattered there and radiated to the photoconductive segments 70a at the side thereof. Therefore, the surface area of the photoconductive segments 70a is increased and electrical resistance there to the writing light greatly varies.

In other words, in the third preferred embodiment, an optical image carried by a writing light of wavelength 600 nm or more and also less can be written in the optical image processor 100c. The charge image corresponding to the optical image is formed in the vicinity of the border of the photoconductive member 70 and light blocking member 72.

The writing light which passed through the transparent high resistive member 70b of the photoconductive member 70 is absorbed by the light blocking member 72 so that the writing light does not affect the reading light.

Further, light components of the reading light which is not reflected at the dielectric mirror 42 is also absorbed by the light blocking member 72. Therefore, electrical resistance of the photoconductive member 70 does not vary so that the charge image formed in the vicinity of the border of the photoconductive member 70 and light blocking member 72 is not changed. The reading operation of the written image is performed in the same manner as the embodiments already described.

While the presently preferred embodiments of the present invention have been shown and described, it is to be understood these disclosures are for the purpose of illustration and that various changes and modifications may be made without departing from the scope of the invention as set forth in the appended claims.

What is claimed is:

1. An optical image processor, comprising first and second transparent electrodes, a photoconductive member and a light-modulation member, both of said members being interposed between said electrodes, for forming a charge image according to a first optical image by photoelectric effect in said photoconductive member when illuminated with an electro-magnetic radiation beam for writing said first optical image, and for forming, in accordance with said charge image, a second optical image correlating with said first optical image by light-modulation on said light-modulation member when illuminated with an electro-magnetic radiation beam for reading, in the presence of an electric field, comprising:

a plurality of photoconductive segments, provided in said photoconductive member, each having a pillar-like structure extending in an applying direction of said electric field, with a space among said photoconductive segments for forming said charge image when illuminated with said electro-magnetic radiation beam for writing, said photoconductive segments exhibiting a specific level of transmittance to a wavelength of said electromagnetic radiation beam for writing; and a transparent high resistive member provided in said space for preventing transfer of electric charges of said formed charge image among said photoconductive segments, said transparent high resistive member exhibiting a higher level of transmittance than said level of transmitance exhibited by said photoconductive segments to the wavelength of said electro-magnetic radiation beam for writing, wherein said electro-magnetic radiation beam for writing incident to said transparent high resistive member is radiated to said photoconductive segments having a pillar-like structure.

2. The processor according to claim 1, wherein the photoconductive segments include hydrogenated amorphous silicon.

3. The processor according to claim 1, wherein the high resistive member includes alumina.

4. The processor according to claim 1, further comprising a light blocking member, provided between said photoconductive member and said light-modulation member, for preventing influence of the electro-magnetic radiation beam for reading to the formed charge image.

5. The processor according to claim 1, further comprising a dielectric mirror member provided between said mirror member provided between said photoconductive member and said light-modulation member for reflecting said electro-magnetic radiation beam for reading.

6. The processor according to claim 5, the dielectric mirror member comprising:

dielectric segments, each having a pillar-like structure extending in the direction of an applied electric field, with a space among said dielectric segments; and a high resistive member provided in said space.

* * * * *